United States Patent
Gonier (10) Patent No.: US 12,412,199 B2
(45) Date of Patent: Sep. 9, 2025

(54) ARTIFICIAL INTELLIGENCE COACH FOR PROVIDING CUSTOMER SERVICE FEEDBACK TO EMPLOYEES

(71) Applicant: The DGC Group, Downers Grove, IL (US)

(72) Inventor: Devin Gonier, Denver, CO (US)

(73) Assignee: The DGC Group, Downers Grove, IL (US)

( * ) Notice: Subject to any disclaimer, the term of this patent is extended or adjusted under 35 U.S.C. 154(b) by 0 days.

(21) Appl. No.: 18/440,051

(22) Filed: Feb. 13, 2024

(65) Prior Publication Data

US 2024/0273584 A1 Aug. 15, 2024

Related U.S. Application Data

(60) Provisional application No. 63/445,115, filed on Feb. 13, 2023.

(51) Int. Cl.
*G06Q 30/0282* (2023.01)

(52) U.S. Cl.
CPC ............................... *G06Q 30/0282* (2013.01)

(58) Field of Classification Search
CPC .................................................. G06Q 30/0282
See application file for complete search history.

(56) References Cited

U.S. PATENT DOCUMENTS

| 11,126,949 B1* | 9/2021 | Shook | G06Q 10/06398 |
| 2005/0055261 A1* | 3/2005 | Esty | G06Q 99/00 |
| | | | 379/9.02 |
| 2014/0114876 A1* | 4/2014 | Montano | G06Q 30/0282 |
| | | | 705/347 |
| 2019/0197106 A1* | 6/2019 | Doggett | G10L 15/22 |
| 2019/0258900 A1* | 8/2019 | Baikadi | G06F 16/904 |
| 2020/0327196 A1* | 10/2020 | Sampat | G06N 20/00 |
| 2021/0042854 A1* | 2/2021 | Hazy | H04L 63/0421 |
| 2021/0390491 A1* | 12/2021 | Ellison | G10L 15/1807 |
| 2022/0058444 A1* | 2/2022 | Olabiyi | G06F 40/35 |
| 2022/0277245 A1* | 9/2022 | Segal | G06Q 10/10 |
| 2023/0186197 A1* | 6/2023 | Pimplikar | G06Q 10/105 |
| | | | 705/7.17 |
| 2023/0237277 A1* | 7/2023 | Reza | G06F 40/169 |
| | | | 704/9 |

(Continued)

OTHER PUBLICATIONS

Cazier, Joseph A., and Jennifer A. Green. "Life coach: using big data and analytics to facilitate the attainment of life goals." 2016 49th Hawaii International Conference on System Sciences (HICSS). IEEE, 2016. (Year: 2016).*

*Primary Examiner* — Corey Russ
(74) *Attorney, Agent, or Firm* — Kilpatrick Townsend & Stockton LLP (57) ABSTRACT

An artificial intelligence coach is provided that can automatically generate customer service feedback for employees of a company. In one example, a computer system can generate an input for the artificial intelligence coach, the input including custom input data that is associated with an employee. The computer system can provide the input to the artificial intelligence coach. The artificial intelligence coach can be configured to generate an output based on the custom input data. The output can include customer service feedback for the employee. The computer system can then transmit the customer service feedback to a client device of the employee via a network.

19 Claims, 6 Drawing Sheets

(56) References Cited

U.S. PATENT DOCUMENTS

| | | | |
|---|---|---|---|
| 2023/0237416 A1* | 7/2023 | Morrissey | G06Q 10/06398 |
| | | | 705/7.42 |
| 2023/0252224 A1* | 8/2023 | Tran | G06F 40/56 |
| | | | 715/256 |
| 2023/0325725 A1* | 10/2023 | Lester | G06N 3/0455 |
| 2023/0419027 A1* | 12/2023 | Pang | G06F 40/216 |
| 2024/0020715 A1* | 1/2024 | Childress | G06Q 10/06393 |
| 2024/0038226 A1* | 2/2024 | Nouri | G06F 40/35 |
| 2024/0054430 A1* | 2/2024 | Maikhuri | G06F 40/40 |
| 2024/0104309 A1* | 3/2024 | Hsu | G06N 3/0455 |
| 2024/0111960 A1* | 4/2024 | Earle | G06F 40/30 |
| 2024/0202452 A1* | 6/2024 | Schillace | G06N 3/0475 |
| 2024/0256762 A1* | 8/2024 | Beauchamp | G06F 40/166 |
| 2024/0256792 A1* | 8/2024 | Maschmeyer | G06F 40/40 |
| 2024/0256793 A1* | 8/2024 | Maschmeyer | G06F 40/40 |
| 2024/0265205 A1* | 8/2024 | Goligorsky | G06F 40/205 |

* cited by examiner

Average number of customers served per hour during peak periods: [32, 20, 45, 60, 12]

Customer satisfaction percentage for speed of service: [90, 80, 45, 32, 90]

Customer feedback comments:
- "Joe was really efficient and helpful"
- "Joe listened carefully and got it all right"
- "Joe seemed to rush through the order. I know its busy but he messed everything up."
- "I am never coming back to this restaurant again! The cashier rushed me way too fast to come up with my order then messed it up."
- "The cashier asked a lot of questions and suggested some good things to try."

204

Write a message addressed to Joe using the custom input data. The message should be casual and empathetic. It should feel like it's coming from a friend that also works at a fast food restaurant. Make some relatable metaphors. Assume Joe is young and has little education. Don't speak down, but speak to him at his level. Include one concrete suggestion based on the data input on Joe's performance. Introduce yourself as Hank from a different restaurant looking at Joe's info.

206

Hey Joe! This is Hank from a different fast food restaurant. I heard you're working at FakeRestaurant and I wanted to reach out and offer some support. I know how tough it can be working at a fast food restaurant, especially when there's a lot going on. It's like trying to catch a bunch of balls in a busy game of juggling, you gotta keep up!

I took a look at some of your recent performance metrics and wanted to offer a suggestion based on what I saw. Based on the average number of customers served per hour during peak periods, it seems like you could benefit from a little time management help. It's all about finding the balance between moving quickly and making sure everything is done right.

Next time you're feeling overwhelmed, try taking a deep breath and breaking down each step of the order. It might slow you down a little in the moment, but it will help you serve more customers in the long run.

Keep up the good work, Joe! And if you ever need someone to talk to or bounce ideas off of, don't hesitate to reach out.

Average number of customers served per hour during peak periods: [32, 20, 45, 60, 12]

Customer satisfaction percentage for speed of service: [90, 80, 45, 32, 90]

Customer feedback comments:
- "Joe was really efficient and helpful"
- "Joe listened carefully and got it all right"
- "Joe seemed to rush through the order. I know its busy but he messed everything up."
- "I am never coming back to this restaurant again! The cashier rushed me way too fast to come up with my order then messed it up"
- "The cashier asked a lot of questions and suggested some good things to try."

304

Give Joe advice from the perspective of an analyst at corporate based on the custom input data. Indicate consequences may occur if Joe doesn't make improvements.

306

I am writing to you from the corporate office of FakeRestaurant, where I have been reviewing your performance as a cashier at one of our locations. I have analyzed the average number of customers served per hour during peak periods, the customer satisfaction percentage for speed of service, and the customer feedback comments, and I wanted to provide some feedback and advice on how you can improve your performance.

First, it is important to note that inconsistency in the number of customers served per hour and fluctuating customer satisfaction ratings can have a negative impact on the overall customer experience and on the reputation of the restaurant. This can ultimately lead to decreased sales and customer loyalty.

To improve your performance, I would suggest the following:

Consistency in customer interaction: Make sure to engage with customers in a friendly and professional manner, listen carefully to their orders, and ask questions when necessary to ensure accuracy and improve customer satisfaction.

Time management during peak periods: Prioritize the flow of customers and use your time efficiently during busy periods to ensure a consistent and efficient service.

Communication skills: Focus on improving your active listening, asking clarifying questions, and making suggestions in a professional manner to enhance the customer experience.

Please keep in mind that failure to make improvements in these areas may result in further performance evaluations and potential consequences, such as coaching, additional training, or disciplinary action.

ARTIFICIAL INTELLIGENCE COACH FOR PROVIDING CUSTOMER SERVICE FEEDBACK TO EMPLOYEES

CROSS-REFERENCE TO RELATED APPLICATION

This claims priority under 35 U.S.C. § 119(e) to U.S. Provisional Patent Application No. 63/445,115, filed on Feb. 13, 2023 and titled "ARTIFICIAL INTELLIGENCE COACH FOR PROVIDING CUSTOMER SERVICE FEEDBACK TO EMPLOYEES," the entirety of which is hereby incorporated by reference herein.

TECHNICAL FIELD

The present disclosure relates generally to artificial intelligence. More specifically, but not by way of limitation, this disclosure relates to an artificial intelligence coach that can automatically generate customer service feedback for employees of a company.

BACKGROUND

Managers today face many obstacles when trying to guide those who work for them. As the size of their employee cohort grows, certain problems grow proportionally. Some examples of obstacles faced by managers include time constraints, lack of personalization, differences in learning styles, resistance to change, difficulty in tracking progress, and communication challenges. For instance, it can be difficult for managers to personalize coaching for each individual in a large group, leading to a lack of effectiveness. Employees may also have different learning styles, which can make it challenging for managers to provide coaching that is tailored to each person's needs. Managers may also struggle to communicate effectively with large groups of employees, leading to misunderstandings and ineffective coaching.

BRIEF DESCRIPTION OF THE DRAWINGS

FIG. 2 shows an example of custom input data, a text prompt, and customer service feedback according to some aspects of the present disclosure.

FIG. 3 shows another example of custom input data, a text prompt, and customer service feedback according to some aspects of the present disclosure.

DETAILED DESCRIPTION

Certain aspects and features of the present disclosure relate to an artificial intelligence coach that can automatically generate customer service feedback for employees of a company, where the customer service feedback can include guidance designed to help the employees improve in their customer service. More specifically, the artificial intelligence coach can be supplied with custom input data that is specific to an individual employee. Based on the custom input data, the artificial intelligence coach can automatically generate tailored feedback designed to improve the employee's customer service abilities. The tailored feedback can include any suitable guidance information, such as textual recommendations, images, videos, links to training content, or any combination of these.

Once generated, the tailored feedback can be provided to the employee through a user interface, such as a text interface or a voice interface. For example, the tailored feedback can be transmitted to the employee as a chat message in a chat interface of a web application or a mobile application. As another example, the tailored feedback can be transmitted as an SMS message to the employee's mobile phone. As still another example, the tailored feedback can be transmitted to the employee as a voice communication, which may take the form of a voicemail or an automated telephone call. Through the user interface, the employee may then engage in follow-on interactions (e.g., the employee may ask follow-up questions via the chat interface or voice interface) with the artificial intelligence coach and receive additional responses. Because the artificial intelligence coach can take into account context like the conversation history when generating its responses, the artificial intelligence coach can provide a realistic conversational experience.

To produce the tailored feedback, the artificial intelligence coach can include one or more machine-learning models. One example of such machine-learning models is a large language model. A large language model is a deep learning algorithm that may recognize, summarize, translate, predict, and generate text and other content based on knowledge gained from being trained on massive training datasets. One popular large language model is GPT-4, which is the fourth generation of a Generative Pre-trained Transformer model produced by Open AI® of San Francisco, California. But, any other suitable large language model may be used. The large language model can receive the custom input data and provide a corresponding output (e.g., tailored feedback) in a text format. This output may be kept in its original text format if it is being delivered to the employee via a text interface. Alternatively, the output may be converted into speech audio using a text-to-speech algorithm if it is being delivered to the employee via a voice interface. User inputs may also be in the form of audio, which can be transcribed into text input.

The custom input data can include any suitable information associated with the corresponding employee. For example, the custom input data can include one or more customer feedback comments (e.g., reviews) relating to prior customer service interactions between the employee and one or more customers. The custom input data may also include one or more performance metrics related to the employee's prior customer service performance, such as the average or total number of customers served in a given time interval or at different points throughout the day, the average length of time devoted to each customer interaction, and customer satisfaction indicators. Contextual information can also be included in the custom input data. For example, the custom input data can include at least part of a prior conversation history between the employee and the artificial intelligence coach. In some examples, the custom input data can further include employee characteristics, such as the employee's attributes or preferences. For example, the custom input data can include a psychological profile associated with the employee, the employee's answers to one or more questions of a questionnaire, the employee's preferred learning style, and the employee's preferred management approach.

The custom input data may also include other information such as predefined settings. The predefined settings may define the tone and length of the tailored feedback, among other things. Examples of such settings can include a level of formality in which to deliver the tailored feedback, a level of empathy with which to deliver the tailored feedback, a maximum or minimum length of the tailored feedback, and a way in which the artificial intelligence coach should refer to itself in the tailored feedback. These settings may be customized by an administrator.

Determining how to structure the custom input data, so that the artificial intelligence coach provides consistent and desirable outputs, can be a challenging task that depends on a wide variety of factors, such as the input data's formatting and content, the underlying architecture of the machine-learning model, how the machine-learning model was trained, and the machine-learning model's hyperparameter settings. For example, the artificial intelligence coach may be configured to receive its input as a text prompt. But similar input prompts may elicit different responses from the artificial intelligence coach due to minor syntactical variations between the input prompts, despite the input prompts including the same core content. In more extreme cases, the responses may have confusing or contradictory guidance, despite the input prompts including the same core content. To help reduce these issues, some examples described herein can employ prompt engineering techniques to help determine how best to structure the custom input data so that the artificial intelligence coach provides consistent and desired responses.

For example, the system can include a prompt generator that can employ A/B testing to learn how to select (e.g., generate or choose) input prompts for the artificial intelligence coach. The prompt generator may include one or more machine-learning models, such as a generative adversarial network or a support vector machine. During a training phase, the prompt generator can automatically create two or more variants of the same input prompt, where the variants are different from one another in at least one aspect, and provide them as input to the artificial intelligence coach. The resulting outputs from the artificial intelligence coach can then be scored based on their desirability. This scoring process can be manual or automated using an algorithm. An output from the artificial intelligence coach may be considered more desirable if it is more clear, persuasive, accurate, consistent with other responses, and/or compliant with one or more selected settings. The scores can be fed back into the prompt generator, which can improve based on the feedback. The prompt generator can iterate this process over time to learn how to select input prompts that yield consistent and/or desirable outputs from the artificial intelligence coach.

Once trained, the prompt generator can be used to create an input prompt for the artificial intelligence coach based on the custom input data for an employee. For example, the prompt generator can automatically generate the actual text of the input prompt based on the custom input data. The input prompt may be structured differently that the custom input data, have more or less information than the custom input data, or may otherwise be different than the custom input data. As another example, the prompt generator can choose a prompt category, from among a predefined set of prompt categories, based on the custom input data. Each prompt category can be mapped to a predefined prompt template. Based on the chosen prompt category, the appropriate prompt template can be selected and populated using the custom input data to produce the input prompt. Regardless of the technique used, once generated, the input prompt can be fed as input to the artificial intelligence coach to produce a corresponding output. The output can include customer service feedback that is tailored to the employee (e.g., that includes specific guidance and recommendations to help the employee improve their customer service capabilities) based on the custom input data.

It will be appreciated that although the above example involves a prompt generator usable to create input text prompts for large language models, similar principles can be applied to generate inputs that are structured differently than text prompts, which may be better suited to other types of machine-learning models. For example, although the prompt generator is one type of input generator, there can also be other types of input generators that are trained to function similarly to the prompt generator, but can generate an input for the artificial intelligence coach in a format other than a text prompt (e.g., a vector format). The appropriate input generator can be chosen based on the characteristics of the artificial intelligence coach, such as the architecture of its underlying machine-learning model.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
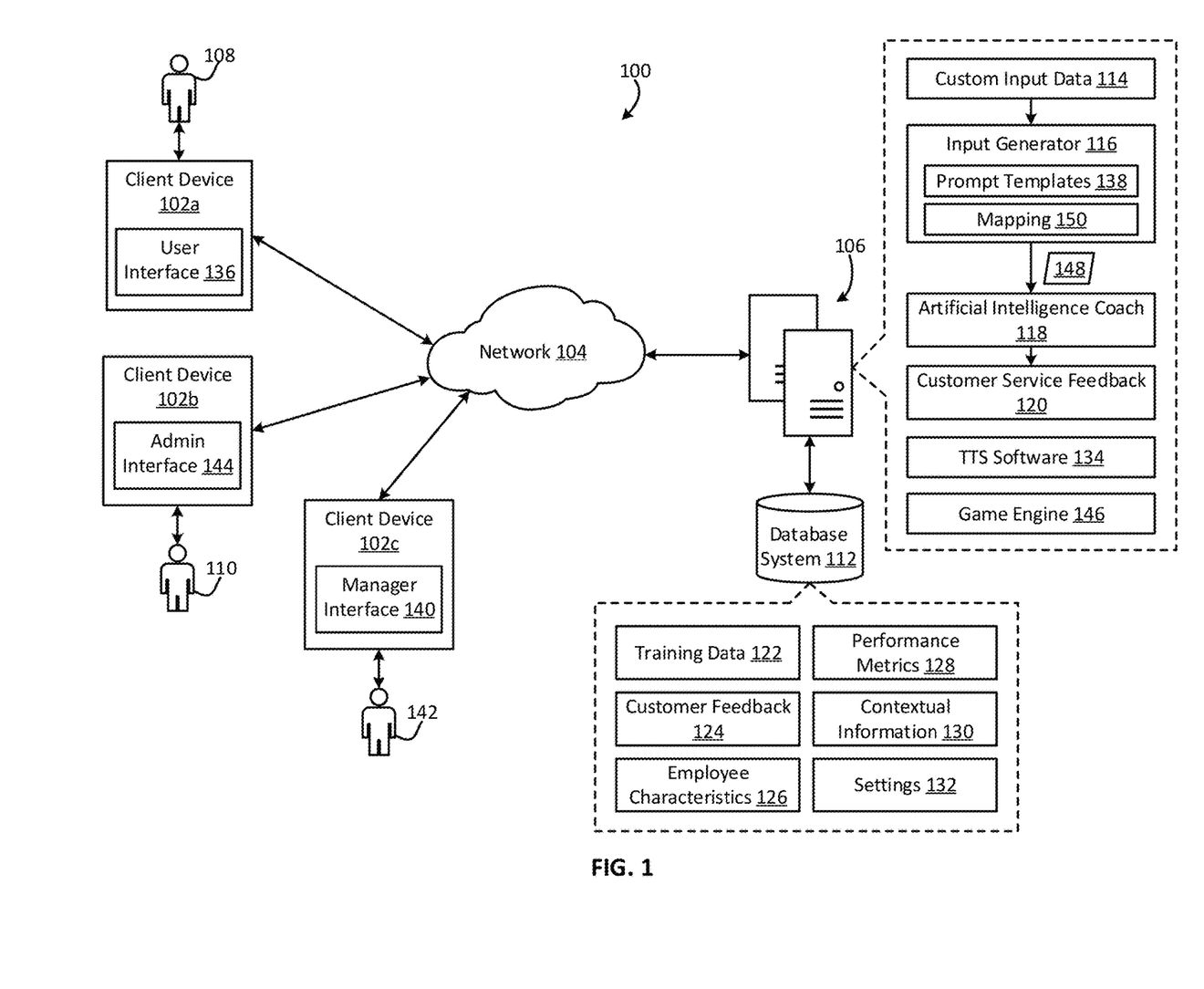
FIG. 1 shows a block diagram of an example of a system for providing an artificial intelligence coach that can automatically generate customer service feedback for employees according to some aspects of the present disclosure.

FIG. 1 is a block diagram of an example of a system 100 for providing an artificial intelligence coach 118 that can automatically generate customer service feedback 120 for employees according to some aspects of the present disclosure. The system 100 includes a computer system 106 with the artificial intelligence coach 118. The computer system 106 can include any number and combination of computing devices, such as servers, desktop computers, and laptop computers. The computer system 106 can have any suitable architecture. For example, the computer system 106 may be a cloud computing system, a computing cluster, or another type of distributed computing system.

In general, the computer system 106 can receive custom input data 114 that is specific to an employee 108. The computer system 106 may then provide the custom input data 114 to an input generator 116, which can automatically convert the custom input data 114 into an input data structure 148 (e.g., a text prompt) that is formatted to be compatible with the artificial intelligence coach 118. The computer system 106 can then provide the input data structure 148 to the artificial intelligence coach 118. The artificial intelligence coach 118 can receive the input data structure 148 and, based on the custom input data 114 contained in the input data structure 148, automatically generate an output that includes customer service feedback 120. The customer service feedback 120 can be specifically tailored to the employee 108. The customer service feedback 120 can then be transmitted over a network 104 to a client device 102a associated with the employee 108. Examples of client devices 102 can include a mobile phone, a tablet, a laptop computer, a desktop computer, and a smart watch. The client device 102a can output the customer service feedback 120 to the employee 108 via a user interface 136, such as a chat interface or a voice interface. Through this process, the employee 108 can receive custom tailored feedback about their customer service performance to help them improve in future customer interactions. More specific details about each of these operations will now be described below.

As noted above, the computer system 106 can receive (e.g., obtain or generate) custom input data 114 related to an individual employee 108. The computer system 106 can receive the custom input data 114 from a database system 112, which may include one or more databases. The database system 112 may be part of the computer system 106. Alternatively, the database system 112 may be separate from and accessible to the computer system 106. The custom input data 114 may include customer feedback 124 related to the employee 108, employee characteristics 126 related to the employee 108, performance metrics 128 related to the employee 108, contextual information 130, settings 132 to control the output of the artificial intelligence coach, or any combination of these.

In some examples, the customer feedback 124 can be provided by customers about their prior encounters with the employee 108. The customer feedback 124 may include reviews and/or ratings, such as star ratings or other types of performance ratings. The customer feedback 124 may be in a textual format and/or a numerical format, depending on the type of feedback provided.

The employee characteristics 126 can include attributes and/or preferences of the employee 108. Examples of the attributes can include an employee's demographic data (e.g., age, sex, address, etc.), employment data (e.g., employment length, role or position, salary, etc.), and psychological profile. The psychological profile may be determined by providing a psychological questionnaire to the employee 108 and receiving the employee's 108 responses. Examples of the employee preferences can include the employee's 108 preferred learning style and the employee's 108 preferred management approach, which may also be selected by the employee 108 via a questionnaire or other means.

The performance metrics 128 can be numerical values characterizing aspects of the employee's past customer-service performance. Examples of the performance metrics 128 can include the average number of customers served in a given time interval or at different points throughout the day by the employee 108, the total number of customers served in a given time interval or at different points throughout the day by the employee 108, the average length of time devoted to each customer interaction by the employee 108, etc.

The contextual information 130 can include any information associated with a conversation history between the artificial intelligence coach 118 and the employee 108. For example, the contextual information 130 may include portions (e.g., snippets) from a prior conversation between the artificial intelligence coach 118 and the employee 108. This may allow the artificial intelligence coach 118 to consider its prior interactions with the employee 108 when formulating subsequent outputs. Additionally or alternatively, the contextual information 130 can include adherence information indicating an extent to which the employee 108 adhered to prior guidance from the artificial intelligence coach 118 provided during a previous conversation. For example, the contextual information 130 can include a prior value for a performance metric and a recent value for the performance metric, where the difference between the two values may suggest an improvement, deterioration, or no change to the employee's performance in a given customer service area. The prior value may have been computed around the time of the prior conversation (e.g., within a few hours of the prior conversation), and the recent value may have been computed around the time of the current conversation (e.g., within a few hours of the current conversation). As another example, the contextual information 130 can indicate a change (e.g., 0%, −5%, or +5%) between the prior value and the recent value. This may allow the artificial intelligence coach 118 to consider the extent to which its prior guidance influenced the behavior of the employee 108 when formulating subsequent outputs.

In some examples, the settings 132 can include configuration parameters that are not specific to the employee 108, but rather include more general customizations impacting the output from the artificial intelligence coach 118. For example, the settings 132 can specify a level of formality in which to deliver the tailored feedback, a level of empathy with which to deliver the tailored feedback, a maximum or minimum length of the tailored feedback, and a way in which the artificial intelligence coach should refer to itself in the tailored feedback. The settings 132 may be customized by an administrator 110 using an administrative interface 144, which may be provided by the computer system 106 to the administrator's client device 102b. The settings 132 may be customized by the administrator 110 prior to the computer system 106 receiving the custom input data 114 for input to the artificial intelligence coach 118.

After receiving the custom input data 114 for an employee 108, the computer system 106 can provide the custom input data 114 to an input generator 116, which can convert the custom input data 114 into an input data structure 148 that is properly formatted for the artificial intelligence coach 118. For example, the input generator 116 can receive the custom input data 114 and generate a text prompt based on the custom input data 114, where the text prompt can include some or all of the custom input data 114. The text prompt can be formatted for compatibility with an input layer of the artificial intelligence coach 118 and may be optimized to yield a desired output from the artificial intelligence coach 118. As another example, the input generator 116 can receive the custom input data 114 and generate a vector based on the custom input data 114, where the vector's numerical values can represent some or all of the custom input data 114. The vector can be formatted (e.g., sized and arranged) for compatibility with an input layer of the artificial intelligence coach 118 and may be optimized to yield a desired output from the artificial intelligence coach 118.

In some examples, the input generator 116 can configure the input data structure 148 using deep learning and prompt templates. For example, the input generator 116 can employ a deep-learning classification approach to learn how to classify an employee 108 based on the employee's customer input data 114. In particular, the input generator 116 can include a classifier (e.g., a deep learning classifier) that that is trained to classify an employee 108 into a particular category, from among a set of predefined categories, based on the employee's custom input data 114. The classifier can be trained using a supervised training process involving training data in which custom input datasets are correlated to target categories. Each of the predefined categories can be correlated to a corresponding prompt template using a predefined mapping 150. There can be multiple prompt templates, where each category can be correlated in the predefined mapping 150 to one of the prompt templates. Each of the prompt templates 138 can differ from one another. After determining the appropriate category for the employee 108 using the classifier, the input generator 116 can select the corresponding prompt template from among the set of prompt templates 138.

After selecting the appropriate prompt template, the input generator 116 can customize the prompt template to create the input data structure 148. For example, the prompt templates may include variables or empty fields that are configurable by the input generator 116 based on the custom input data 114. In some cases, the input generator 116 may fill in the variables or empty fields using the custom input data 114. In more complex examples, the input generator 116 can include a Bidirectional Encoder Representation from Transformer (BERT) model or other masked-language model, which can be used to customize the selected prompt template to specific goals or objectives, such as obtaining a desired output from the artificial intelligence coach 118. The BERT model may be used to fill in the blanks of a masked prompt template according to an input signals provided by the system. Some reinforcement learning techniques may also be used to improve the system.

Another example of a training technique may involve the input generator 116 automatically generating multiple variants of the same input data structure. The variants can deviate slightly from one another. The input generator 116 can produce the variants using a generative model. The input generator 116 can then provide the variants as input to the artificial intelligence coach 118, which can output customer service feedback corresponding to each variation. The customer service feedback associated with each variation may then be scored (e.g., manually or automatically) based on its conformity with one or more predefined criteria, such as its clarity, persuasiveness, accuracy, consistency with other responses, and/or compliance with one or more selected settings 132. The scores can be fed back into the input generator 116, which can tune its models based on the feedback (e.g., using a reinforcement training approach). The input generator 116 can iterate this process over time to learn how to configure the input data structure to achieve an improved (e.g., optimal) output from the artificial intelligence coach 118.

After generating the input data structure 148, the computer system 106 can provide the input data structure 148 to the artificial intelligence coach 118. The artificial intelligence coach 118 can include one or more machine-learning models, such as neural networks. For instance, the artificial intelligence coach 118 can include a large language model, which can accept a text prompt as an input and generate human-readable text as an output. The output text may follow normal language syntactical and grammar rules, including the use of full sentences and punctuation. The text output may be provided in any suitable language, such as English, Chinese, French, or German. The output language may be customizable during the training phase for the artificial intelligence coach 118, for example by providing it with training data (e.g., training data 122) in the chosen language. Details about the training phase for the artificial intelligence coach 118 are described later on.

In response to receiving the input data structure 148, the artificial intelligence coach 118 can generate an output that includes customer service feedback 120. The customer service feedback 120 can be tailored guidance designed to help the employee 108 improve their customer service in future customer interactions. The guidance can be tailored based on the custom input data 114 embedded in the input data structure 148. The guidance can be designed to address issues that normally arise in a customer service context, such as professionalism, speech clarity and speed, adherence to the customer's objectives, efficiency, etc. The guidance can include textual information, links to websites (e.g., with training videos or downloadable content like customer service manuals), images that teach or support concepts, or any combination of these.

The computer system 106 can then provide the customer service feedback 120 to the employee 108, for example by transmitting it to the employee's client device 102a for output via a user interface 136. In some examples, the user interface 136 may be a chat interface and the customer service feedback 120 may be presented as a chat message in the chat interface. In other examples, the user interface 136 is an SMS interface and the customer service feedback 120 can be presented as a text message sent over a telephone network. In still other examples, the user interface 136 can be an audio interface, such as a voice communication interface. In some such examples, the customer service feedback 120 can be presented as audio, such as speech generated using one or more text-to-speech software 134. The text-to-speech software 134 may itself include machine-learning models or other algorithms. Examples of such text-to-speech software 134 can include WaveNet, SV2TTS, and Tensorflow TTS.

After receiving the customer service feedback 120, the employee 108 may take action based on the customer service feedback 120. In some examples, the computer system 106 can detect this action and provide positive reinforcement for the employee 108. For example, the employee 108 may click a hyperlink embedded in the customer service feedback 120 to view a training lesson, which may be provided as a video, an article, or an interactive web-based lesson. The computer system 106 can detect that the hyperlink was selected, that the training lesson was viewed, and/or that the training lesson was completed by the employee 108. In response to making this detection, the computer system 106 may transmit another message to the employee 108 via the user interface 136 that acknowledges and/or praises the employee's actions. As another example, the computer system 106 can detect an improvement in one of the employee's performance metrics by at least a threshold amount, following the employee's receipt of the customer service feedback 120. In response to making this detection, the computer system 106 may transmit another message to the employee 108 via the user interface 136 that acknowledges and/or praises this improvement. In either scenario, the computer system 106 may transmit the message on behalf of the artificial intelligence coach 118. For example, the computer system 106 can transmit the message to the chat interface on behalf of the artificial intelligence coach 118, so that it appears as if the message was sent from the artificial intelligence coach 118, regardless of whether or not the artificial intelligence coach 118 was actually executed to create the message. Though in some examples, the computer system 106 can leverage the artificial intelligence coach 118 to create the message, for example by providing it with a new set of custom input data 114 indicating the employee's actions or improvements.

In some examples, the employee 108 may also supply a response to the customer service feedback 120 via the user interface 136. For example, the employee 108 can provide a chat message response or a voice response via the user interface 136. The response may include a comment or follow-up question. The computer system 106 can receive the employee's response, generate a new set of custom input data based on the input responses and any of the employee-specific information described above, and then iterate the above process to produce a new output from the artificial intelligence coach 118. In generating the new output, the artificial intelligence coach 118 can consider its prior customer service feedback 120 and the employee's response, among other things, to provide a new output that is contextually aware. The computer system 106 can then provide the new output to the employee 108 via the user interface 136. This back-and-forth can continue in a conversational manner, which may improve the realism of the interaction and allow the employee 108 to obtain clarifications and additional information as desired.

In some examples, a manager 142 of the employee 108 can also access the customer service feedback 120 provided to the employee 108. For example, the manager 142 can operate a client device 102 to access a manager interface 140 provided by the computer system 106. The manager interface 140 can include a dashboard that allows the manager 142 to view performance metrics 128 associated with the employee 108, customer service feedback provided by the artificial intelligence coach 118 to the employee 108 (which may also be stored in the database system 112), responses from the employee 108 to the customer service feedback, and other information related to the employee's performance. This may help the manager 142 track the employee's performance and adherence to the guidance provided by the artificial intelligence coach 118.

In addition to providing customer service feedback 120, the artificial intelligence coach 118 may provide other information and games (e.g., challenges or bets) to the employee 108. For example, the artificial intelligence coach 118 can determine that the employee 108 has a performance metric 128 that is below a predefined threshold, indicating that the corresponding performance area needs significant improvement. To help promote that improvement, the artificial intelligence coach 118 can offer the employee 108 a reward for improving the performance metric by a certain amount. The artificial intelligence coach 118 can make this offer via the user interface 136, such as via a chat message in a chat interface. In some examples, the offer can be a challenge or bet. For instance, the employee 108 may be rewarded with points over time based on their performance. The artificial intelligence coach 118 can challenge the employee 108 to improve the performance metric by a certain percentage in a certain time window (e.g., 10% by next quarter) and, if the employee 108 agrees to and fulfills the challenge, the employee 108 can be rewarded with additional points. The employee 108 may agree to the challenge via the user interface 136, for example by submitting a confirmation chat message in the chat interface. In some cases, the employee 108 may wager a certain amount of their existing points against the challenge. If they complete the challenge, they may win the wagered amount of points or a multiplier thereof (e.g., 1.5×, 2×, or 4×). If the employee 108 does not complete the challenge, their point total may be reduced by the wagered amount of points or a multiplier thereof. The above-mentioned games can be facilitated by a game engine 146, which can interact with the artificial intelligence coach 118 to establish the game, monitor progress of the game, and distribute point awards accordingly.

Any of the above processes can be triggered by any suitable event. For example, the employee 108 may request the customer service feedback 120 from the artificial intelligence coach 118 via the user interface 136, which may trigger the generation and provision of the customer service feedback 120 to the employee 108. As another example, the artificial intelligence coach 118 may periodically provide customer service feedback to the employee 108 automatically at designated time intervals, like once a quarter. As yet another example, the manager 142 may interact with the manager interface 140 to manually trigger the artificial intelligence coach 118 to provide customer service feedback 120 to the employee 108.

Other examples of rewards and games for performance evaluation and related systems are described in U.S. Pat. No. 11,227,251, hereby incorporated by reference, which may be implemented, at least in part, by computer system 106 or a component thereof, in addition to the other features and aspects described herein, such as relating to artificial intelligence coaching.

Turning now to FIGS. 2-3, shown are examples of custom input data, input data structures, and customer service feedback that can be generated according to some aspects of the present disclosure. More specifically, FIG. 2 shows an example of custom input data 202 generated for a specific employee 108. The custom input data 202 includes metrics (e.g., average number of customers served per hour during peak periods) and customer feedback 124 (e.g., customer satisfaction percentages for speed of service and feedback comments). The custom input data 202 can be combined with a text prompt 204 to produce an input data structure 148 for the artificial intelligence coach 118. The text prompt 204 can define what type of message is to be created, its tone and level of empathy, and other characteristics of the message. In response to receiving the input data structure 148, the artificial intelligence coach 118 can produce customer service feedback 206, which includes tips for the employee 108 to improve their customer service performance. Another example of a similar process that uses the same custom input data 202 is shown in FIG. 3. In this example, although the custom input data 202 is the same, the text prompt 304 is different from the text prompt shown in FIG. 2. This leads to a significantly different set of customer service feedback 306, in terms of formality, style, and content.

Figure 4:
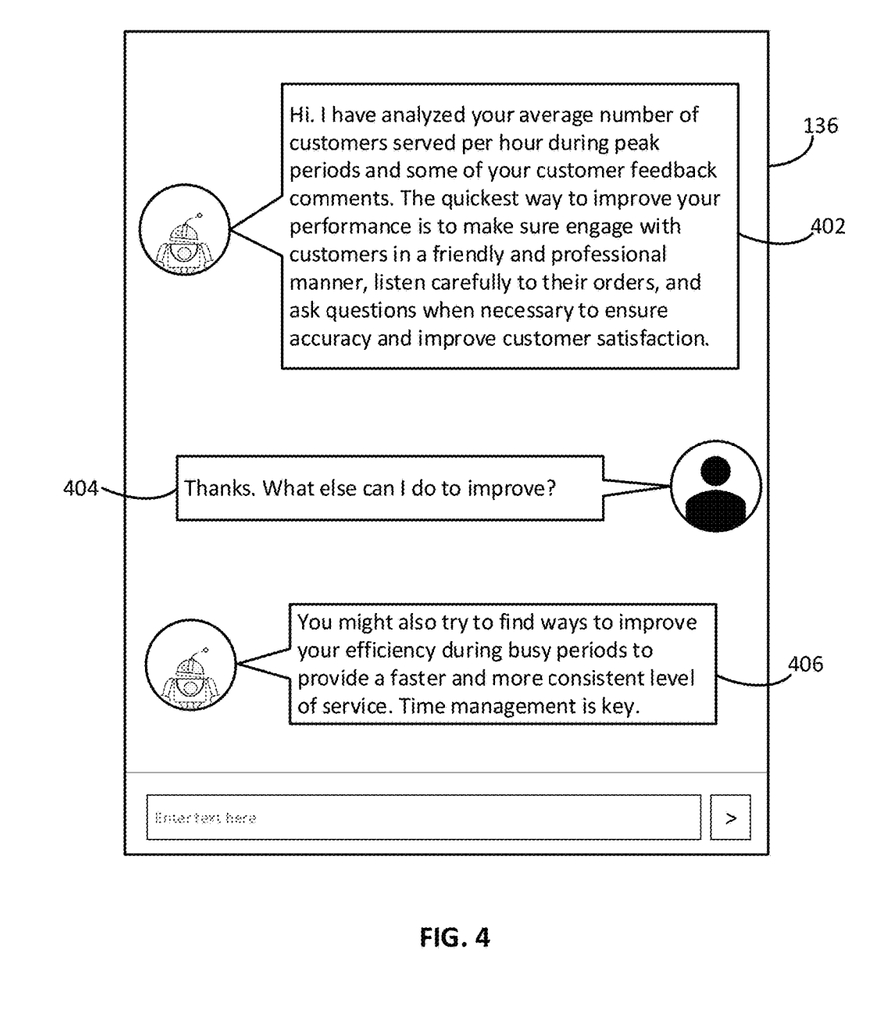
FIG. 4 shows an example of a user interface for interacting with an artificial intelligence coach according to some aspects of the present disclosure.

FIG. 4 shows an example of a user interface 136 for interacting with an artificial intelligence coach 118 according to some aspects of the present disclosure. In this example, the user interface 136 is a chat interface, though other types of interfaces may be used in other examples. The artificial intelligence coach 118 can generate a chat message 402 that includes an initial set of customer service feedback 120. The employee 108 may read the initial set of customer service feedback 120 and enter a return message 404 asking for additional information. The artificial intelligence coach 118 may then generate a response message 406 based on the return message 404, its initial set of customer service feedback 120, and other information about the employee 108. This conversation can continue as desired, with additional replies and responses between the employee 108 and the artificial intelligence coach 118. In some cases, the artificial intelligence coach 118 can provide updates over time to the employee unilaterally (e.g., without being triggered by the employee 108). For example, if the employee 108 makes significant improvement with respect to a performance metric 128, the computer system 106 can detect this improvement and trigger the artificial intelligence coach 118 to generate a chat message to the employee 108 acknowledging and/or praising the improvement.

Figure 5:
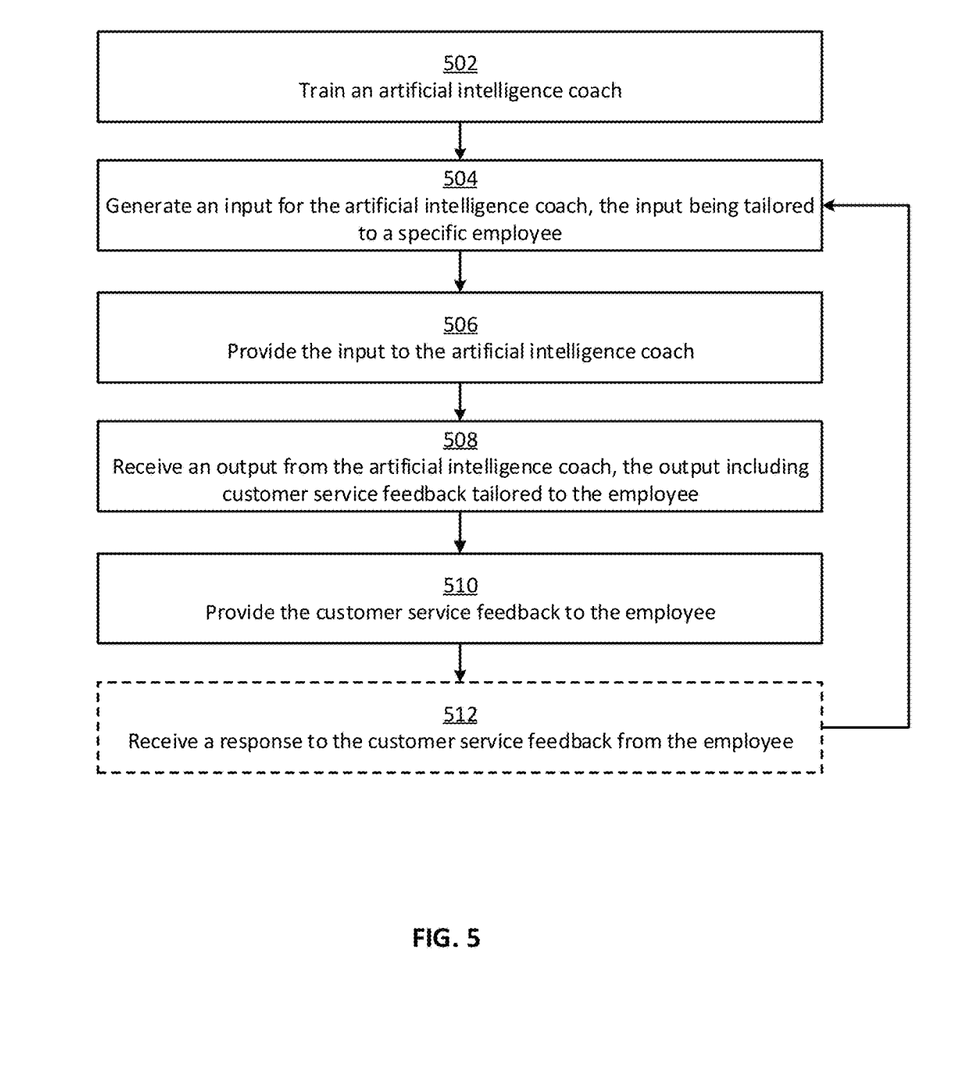
FIG. 5 shows a flowchart of an example of a process for providing and using an artificial intelligence coach according to some aspects of the present disclosure.

FIG. 5 shows a flowchart of an example of a process for providing an artificial intelligence coach 118 that can automatically generate customer service feedback 120 for employees according to some aspects of the present disclosure. Other examples may involve more steps, fewer steps, different steps, or a different order of steps than is shown in FIG. 5. The steps of FIG. 5 are described below with reference to the components of FIG. 1 described above.

In block 502, a computer system 106 trains an artificial intelligence coach 118. In general, the artificial intelligence coach 118 can include a machine-learning model. The computer system 106 can train the machine-learning model using training data (e.g., training data 122). The computer system 106 can execute an initial training process, such as a supervised or semi-supervised learning process, using the training data to train the machine-learning model. The computer system 106 may then further finetune the machine-learning model by performing additional domain-specific training tasks, if desired.

As one particular example, the artificial intelligence coach 118 can include a large language model. In this example, the training data can include a large corpus of texts. Examples of such texts can include books, academic papers, blog posts, social media posts, reviews, news articles, screenplays, laws, regulations, website content, source code for software, or portions thereof. These texts may be provided in one or more languages, such as English, Hebrew, or Spanish. The computer system 106 can execute a semi-supervised training process to train the large language model using the training data. Since the corpus of texts may span a relatively broad range of topics, the large language model's outputs may also be somewhat generic at this stage (e.g., rather than domain specific). To better tailor the large language model to providing customer service feedback, the large language model may undergo further finetuning using task-specific training data. In this context, the task-specific training data may be additional training data related to providing customer service feedback. After this additional finetuning, the large language model may be able to output customer service feedback that is relatively accurate. The customer service feedback may be output by the large language model in natural language form, so that it is human readable.

In some examples, the artificial intelligence coach 118 may periodically undergo additional training to improve its accuracy. This additional training can be triggered by various events. For example, the computer system 106 may perform this additional training based on the passage of a predefined time interval (e.g., one month), the receipt of additional training data from one or more sources, a manual trigger from an administrator 110 via the administrator interface 144, employee feedback about the quality of the customer service feedback provided by the artificial intelligence coach 118, or any combination of these.

In block 504, the computer system 106 generates an input for the artificial intelligence coach 118. The input can be at least partially tailored to a specific employee 108. For example, the computer system 106 can obtain employee data associated with the employee 108. The employee data can include customer feedback 124, employee characteristics 126, and performance metrics 128 specific to the employee 108. The employee data can also include contextual information 130 associated with the employee 108, such as at least part of a prior conversation history between the employee 108 and the artificial intelligence coach 118. The computer system 106 may also obtain data that is not specific to the employee 108, such as settings 132 defining one or more characteristics of (e.g., limitations on) the output from the artificial intelligence coach 118. The computer system 106 can then generate the input based on the employee data and the settings 132. For example, the computer system 106 can generate custom input data 114 that includes the employee data and the settings 132. The computer system 106 can then provide the custom input data 114 to an input generator 116, which can generate a text prompt based on the custom input data 114. The text prompt can serve as the input for the artificial intelligence coach 118.

In block 506, the computer system 106 provides the input to the artificial intelligence coach 118. For example, the computer system 106 can provide input to an input layer of a machine-learning model of the artificial intelligence coach 118. In one example in which the input is a text prompt and the machine-learning model is a large language model, the computer system 106 can provide the text prompt to an input layer of the large language model.

In block 508, the computer system 106 receives an output from the artificial intelligence coach 118. The output can include customer service feedback 120 tailored to the employee 108. The customer service feedback 120 may be text content in natural language form, with specific guidance as to how the employee 108 can improve their customer service abilities.

In some examples, the customer service feedback 120 can include variables or placeholders that can be substituted with other content (e.g., links, videos, or images) before the customer service feedback 120 is presented to the employee 108. For example, the customer service feedback 120 can include the placeholder </video:TrainingVideo1>, which can signal to the computer system 106 that a particular training video (e.g., Training Video #1) or a hyperlink thereto should be incorporated into the customer service feedback 120 at that location. As example, the customer service feedback 120 can include the placeholder </image:training17>, which can signal to the computer system 106 that a particular training image (e.g., Training Image #17) should be incorporated into the customer service feedback 120 at that location. The computer system 106 can analyze the customer service feedback 120 from the artificial intelligence coach 118 to detect these placeholders, and incorporate the appropriate content into the customer service feedback 120, prior to providing the customer service feedback 120 to the employee 108.

In block 510, the computer system 106 provides the customer service feedback 120 to the employee 108. For example, the computer system 106 can transmit the customer service feedback 120 to a client device 102a associated with the employee 108 via a network 104. The network 104 may be a public network such as the Internet or a private network such as a local area network (LAN). In some examples, the network 104 may be a telephone network. The employee 108 can operate the client device 102a to receive the customer service feedback 120.

In some examples, the computer system 106 can provide the customer service feedback 120 to the employee 108 in text form, such as via a chat interface or an SMS interface. In other examples, the computer system 106 can provide the customer service feedback 120 to the employee 108 in audio form, such as synthesized speech using text-to-speech software 134.

In some examples, the employee 108 may wish to further interact with the artificial intelligence coach 118. For instance, the employee 108 may wish to ask a question about the customer service feedback 120. In some such examples, the process may proceed to block 512. In block 512, the computer system 106 receives a response to the customer service feedback 120 from the employee 108. The response may be a question or comment about the customer service feedback 120. The employee 108 can operate the client device 102a to input the response, which may be received by the computer system 106 via the network 104. The response may be provided as text or audio (e.g., a voice communication), depending on the user interface 136 being used. If the response is provided in audio form, the client device 102a or the computer system 106 may convert it to textual form using speech-to-text software. The process may then return to block 504, where another input may be generated based on the response from the employee 108 and/or the customer service feedback 120 previously provided, and the rest of the process can iterate.

Figure 6:
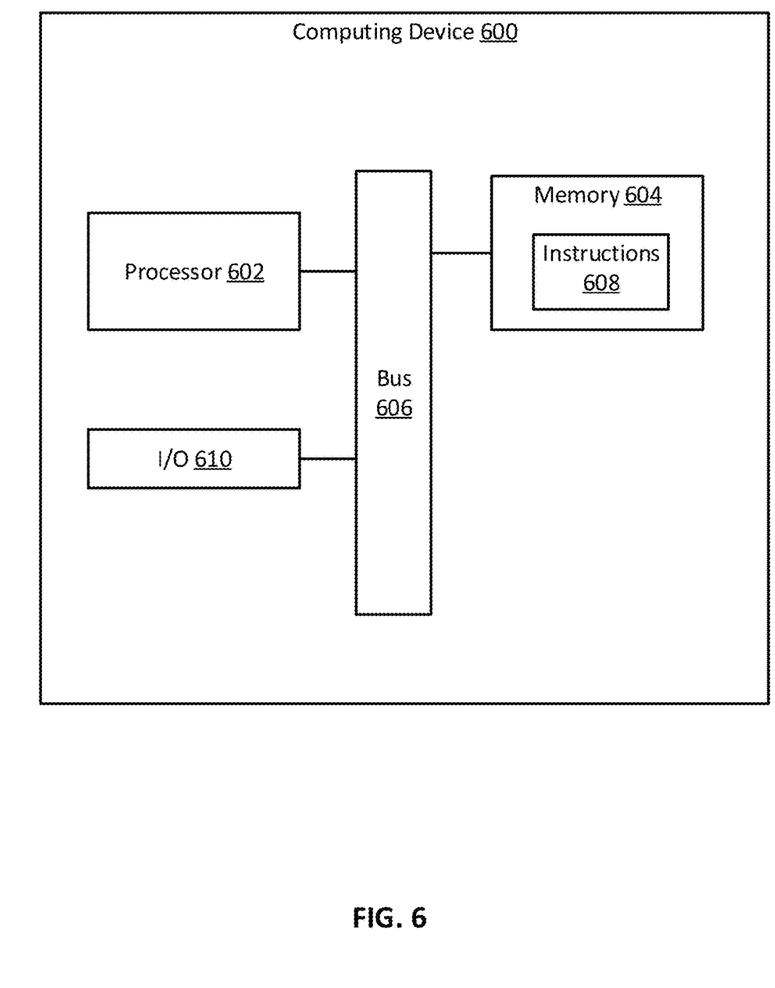
FIG. 6 shows a block diagram for an example of a computing device usable to implement some aspects of the present disclosure.

FIG. 6 shows a block diagram of an example of a computing device 600 usable to implement some aspects of the present disclosure. The computing device 600 may correspond to any of the client devices 102a-c or may be part of the computer system 106, in some examples.

The computing device 600 includes a processor 602 coupled to a memory 604 via a bus 606. The processor 602 can include one processing device or multiple processing devices. Non-limiting examples of the processor 602 include a Field-Programmable Gate Array (FPGA), an application-specific integrated circuit (ASIC), a microprocessor, or any combination of these. The processor 602 can execute instructions 608 stored in the memory 604 to perform operations. Examples of such operations can include any of the operations described above with respect to the computer system 106. In some examples, the instructions 608 can include processor-specific instructions generated by a compiler or an interpreter from code written in any suitable computer-programming language, such as C, C++, C #, Python, or Java.

The memory 604 can include one memory device or multiple memory devices. The memory 604 can be volatile or non-volatile, such that the memory 604 retains stored information when powered off. Non-limiting examples of the memory 604 include electrically erasable and programmable read-only memory (EEPROM), flash memory, or any other type of non-volatile memory. At least some of the memory device can include a non-transitory computer-readable medium from which the processor 602 can read instructions 608. A computer-readable medium can include electronic, optical, magnetic, or other storage devices capable of providing the processor 602 with computer-readable instructions or other program code. Non-limiting examples of a computer-readable medium can include magnetic disks, memory chips, ROM, random-access memory (RAM), an ASIC, a configured processor, optical storage, or any other medium from which a computer processor can read the instructions 608.

The computing device 600 may also include, or be coupled to, input and output (I/O) components 610. The input components can include a mouse, a keyboard, a microphone, a trackball, a touch pad, a touch-screen display, or any combination of these. The output components can include a visual display, an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A method comprising:
executing, by one or more processors, a training phase for a prompt generator, wherein the training phase involves:
generating, by a machine-learning model of the prompt generator, a plurality of input prompts intended for an artificial intelligence coach;
providing, by the one or more processors, the plurality of input prompts as input to the artificial intelligence coach, the artificial intelligence coach being configured to generate a plurality of outputs based on the plurality of input prompts;
generating, by the one or more processors, a plurality of scores for the plurality of input prompts based on the plurality of outputs, wherein each score in the plurality of scores indicates a degree to which a corresponding output of the plurality of outputs is persuasive, accurate, and/or consistent with other outputs; and
further training, by the one or more processors, the machine-learning model of the prompt generator based on the plurality of scores; and
after the training phase for the prompt generator:
generating, by the prompt generator, an input prompt for the artificial intelligence coach, the input prompt including custom input data associated with an employee, wherein the input prompt includes a predefined setting, and wherein the predefined setting specifies (i) a level of formality in which to deliver customer service feedback to the employee, (ii) a level of empathy with which to deliver the customer service feedback to the employee, (iii) a maximum or minimum length for the customer service feedback, or (iv) a way in which the artificial intelligence coach should refer to itself in the customer service feedback;
providing, by the one or more processors, the input prompt to the artificial intelligence coach, the artificial intelligence coach being configured to generate an output based on the custom input data, the output including the customer service feedback for the employee;
transmitting, by the one or more processors, the customer service feedback to a client device of the employee via a network; and
after transmitting the customer service feedback to the client device of the employee, engaging, by the one or more processors, in a follow-on conversation with the employee about the customer service feedback using the artificial intelligence coach, wherein the engaging in the follow-on conversation involves receiving a message related to the customer service feedback from the employee and generating a response to the message using the artificial intelligence coach.

2. The method of claim 1, wherein the artificial intelligence coach includes a large language model.

3. The method of claim 1, wherein the custom input data includes customer feedback related to the employee, one or more performance metrics related to the employee, and one or more employee characteristics.

4. The method of claim 3, wherein the custom input data includes contextual information related to a conversation history between the artificial intelligence coach and the employee.

5. A system comprising:
one or more processors; and
one or more memories including instructions that are executable by the one or more processors for causing the one or more processors to perform operations including:
  executing a training phase for a prompt generator, wherein the training phase involves:
    generating, by a machine-learning model of the prompt generator, a plurality of input prompts for an artificial intelligence coach;
    providing the plurality of input prompts as input to the artificial intelligence coach, the artificial intelligence coach being configured to generate a plurality of outputs based on the plurality of input prompts;
    generating a plurality of scores for the plurality of input prompts based on the plurality of outputs, wherein each score in the plurality of scores indicates a degree to which a corresponding output of the plurality of outputs is persuasive, accurate, and/or consistent with other outputs; and
    further training the machine-learning model of the prompt generator based on the plurality of scores; and
  after the training phase for the prompt generator:
    generating, using the prompt generator, an input prompt for the artificial intelligence coach, the input prompt including custom input data associated with an employee, wherein the input prompt includes a predefined setting, and wherein the predefined setting specifies (i) a level of formality in which to deliver customer service feedback to the employee, (ii) a level of empathy with which to deliver the customer service feedback to the employee, (iii) a maximum or minimum length for the customer service feedback, or (iv) a way in which the artificial intelligence coach should refer to itself in the customer service feedback;
    providing the input prompt to the artificial intelligence coach, the artificial intelligence coach being configured to generate an output based on the custom input data, the output including the customer service feedback for the employee;
    transmitting the customer service feedback to a client device of the employee via a network; and
    after transmitting the customer service feedback to the client device of the employee, engaging in a follow-on conversation with the employee about the customer service feedback using the artificial intelligence coach, wherein the engaging in the follow-on conversation involves receiving a message related to the customer service feedback from the employee and generating a response to the message using the artificial intelligence coach.

6. The system of claim 5, wherein the input prompt is formatted as a text prompt.

7. The system of claim 5, wherein the custom input data includes customer feedback related to the employee, one or more performance metrics related to the employee, and one or more employee characteristics.

8. The system of claim 5, wherein the custom input data includes contextual information related to a conversation history between the artificial intelligence coach and the employee.

9. The system of claim 5, wherein the custom input data includes a predefined setting defining a characteristic of the customer service feedback, wherein the predefined setting is selected by an administrator that is separate from the employee, and wherein the predefined setting is unrelated to the employee.

10. A non-transitory computer-readable medium comprising program code that is executable by one or more processors for causing the one or more processors to perform operations including:
  executing a training phase for a prompt generator, wherein the training phase involves:
    generating, by a machine-learning model of the prompt generator, a plurality of input prompts for an artificial intelligence coach;
    providing the plurality of input prompts as input to the artificial intelligence coach, the artificial intelligence coach being configured to generate a plurality of outputs based on the plurality of input prompts;
    generating a plurality of scores for the plurality of input prompts based on the plurality of outputs, wherein each score in the plurality of scores indicates a degree to which a corresponding output of the plurality of outputs is persuasive, accurate, and/or consistent with other outputs; and
    further training the machine-learning model of the prompt generator based on the plurality of scores; and
  after the training phase for the prompt generator:
    generating, using the prompt generator, an input prompt for the artificial intelligence coach, the input prompt including custom input data associated with an employee, wherein the input prompt includes a predefined setting, and wherein the predefined setting specifies (i) a level of formality in which to deliver customer service feedback to the employee, (ii) a level of empathy with which to deliver the customer service feedback to the employee, (iii) a maximum or minimum length for the customer service feedback, or (iv) a way in which the artificial intelligence coach should refer to itself in the customer service feedback;
    providing the input prompt to the artificial intelligence coach, the artificial intelligence coach being configured to generate an output based on the custom input data, the output including the customer service feedback for the employee;
    transmitting the customer service feedback to a client device of the employee via a network; and
    after transmitting the customer service feedback to the client device of the employee, engaging in a follow-on conversation with the employee about the customer service feedback using the artificial intelligence coach, wherein the engaging in the follow-on conversation involves receiving a message related to the customer service feedback from the employee and generating a response to the message using the artificial intelligence coach.

11. The non-transitory computer-readable medium of claim 10, wherein the custom input data includes customer feedback related to the employee, one or more performance metrics related to the employee, and one or more employee characteristics.

12. The method of claim 1, wherein the input prompt generated by the prompt generator is in a format other than text.

13. The method of claim 1, further comprising, prior to providing the input prompt to the artificial intelligence coach:

classifying the employee into a particular category based on the custom input data;

selecting a prompt template, from among a plurality of prompt templates, based on the particular category into which the employee is classified; and generating the input prompt based on the prompt template.

14. The method of claim 1, further comprising:

after transmitting the customer service feedback to the client device of the employee, detecting an event indicating that the employee acted on the customer service feedback; and in response to detecting the event, transmitting a positive reinforcement message on behalf of the artificial intelligence coach to the employee.

15. The method of claim 14, further comprising:

generating the positive reinforcement message using the artificial intelligence coach.

16. The method of claim 1, further comprising:

providing a dashboard to a manager of the employee, wherein the dashboard indicates the customer service feedback provided to the employee and one or more performance metrics of the employee, the dashboard being usable by the manager to track the employee's performance and adherence to guidance provided by the artificial intelligence coach over a period of time.

17. The non-transitory computer-readable medium of claim 10, wherein the operations further comprise:

after transmitting the customer service feedback to the client device of the employee, detecting an event indicating that the employee acted on the customer service feedback; and in response to detecting the event, transmitting a positive reinforcement message on behalf of the artificial intelligence coach to the employee.

18. The non-transitory computer-readable medium of claim 17, wherein the operations further comprise:

generating the positive reinforcement message using the artificial intelligence coach.

19. The non-transitory computer-readable medium of claim 10, wherein the operations further comprise:

providing a dashboard to a manager of the employee, wherein the dashboard indicates the customer service feedback provided to the employee and one or more performance metrics of the employee, the dashboard being usable by the manager to track the employee's performance and adherence to guidance provided by the artificial intelligence coach over a period of time.

* * * * *